United States Patent [19]

Ohsawa et al.

[11] 3,930,882

[45] Jan. 6, 1976

[54] RECHARGEABLE GALVANIC CELL

[75] Inventors: Kazuya Ohsawa; Katsuyoshi Hirasa, both of Yokohama; Hideo Kinoshita, Ishikawa, all of Japan

[73] Assignees: The Furukawa Electric Co., Ltd., Tokyo; The Furukawa Battery Co., Ltd., Yokohama, both of Japan

[22] Filed: Jan. 25, 1974

[21] Appl. No.: 436,621

[30] Foreign Application Priority Data

Jan. 31, 1973  Japan............................... 48-12577
Feb. 6, 1973  Japan............................... 48-14999
Apr. 9, 1973  Japan............................... 48-40203
Apr. 9, 1973  Japan............................... 48-40204

[52] U.S. Cl............................... 136/30; 136/154
[51] Int. Cl............................... H01m 43/06
[58] Field of Search.................. 136/30–31, 136/154, 6 R, 155, 161; 204/55 R; 260/567.6

[56] References Cited

UNITED STATES PATENTS

| | | | |
|---|---|---|---|
| 3,653,965 | 4/1972 | Lee | 136/30 |
| 3,660,170 | 5/1972 | Rampel | 136/154 |
| 3,775,183 | 11/1973 | Paulson | 136/30 |
| 3,793,079 | 2/1974 | Brown et al. | 136/30 |

Primary Examiner—Anthony Skapars
Attorney, Agent, or Firm—Bacon & Thomas

[57] ABSTRACT

A rechargeable galvanic cell which comprises a zinc anode, a cathode and an electrolyte wherein the electrolyte comprises an aqueous alkaline solution containing alkali metal zincate and a polycation in an amount sufficient to suppress the formation of zinc dendrites on the surface of the zinc anode during cell charge.

17 Claims, No Drawings

RECHARGEABLE GALVANIC CELL

This invention relates to a secondary cell provided with a novel zinc-containing electrolyte which contains a polycation for suppressing formation of zinc dendrites during the charging cycle.

A galvanic cell using zinc as an anode has a high cell voltage and can have a high energy density. When electrolytically deposited from its aqueous alkaline solution, zinc tends to deposit on the anode in the form of dendritic crystals. Therefore, with a cell provided with a zinc anode and a zinc-containing aqueous alkaline electrolyte, zinc dendrites are formed on the zinc anode during cell charge. The dendrites grow more prominently as the cell charge advances, and penetrate a separator interposed between the anode and cathode, causing the internal short circuit in the cell, and in consequence considerably shortening the cycle life of the cell.

To date, many approaches have been made to eliminate the above-mentioned defect so as to provide a cell having a long cycle life. One of those approaches consists of mixing in an electrolyte an additive capable of suppressing the deposition of zinc dendrites on the anode. For example, the U.S. Pat. No. 3,653,965 proposes application of polyethylene oxide such as polyethylene glycol as an additive to an electrolyte. However, this compound fails to maintain the effect of suppressing the formation of zinc dendrites for long in an alkaline solution. Another prior art attempt reports the effect of tetraalkyl ammonium salt as an additive (J. Electrochem. Soc., Vol. 17, No. 9, p. 1,154, 1970). However, this additive is not sufficiently effective in preventing the formation of zinc dendrites during cell charge.

It is accordingly an object of this invention to provide an electrolyte free from the formation of zinc dendrites during the operation of charging a secondary cell using zinc as an anode.

Another object of the invention is to provide a secondary cell using zinc as an anode whose cycle life has been prominently prolonged.

This invention is based on the discovery that addition of a cationic polyelectrolyte to a zinc-containing alkaline electrolyte is very effective in eliminating the formation of zinc dendrites during cell charge, and moreover said effect is sustained over a long period, thereby making it possible to provide a secondary cell having a prominently extended cycle life.

A cationic polyelectrolyte, namely, polycation having two or more ion sites in a molecule has been found capable of suppressing the formation of zinc dendrites.

A desired type of polycation effective in eliminating the formation of zinc dendrites is an organic compound having two or more cationic ion sites in a molecule. A more preferred type of such polycation is an organic high polymer having two or more cationic ion sites in a molecule. In addition, a polycation whose cationic ion sites consist of quarternary nitrogen is particularly effective in suppressing the formation of zinc dendrites. Such polycations include an ionen type (also referred to as integral type) polycation having quarternary nitrogen included in the main chain of a molecule; a pendant type polycation having quarternary nitrogen included in the side chain of a molecule; and another type having quarternary nitrogen included in a molecule as a member of a heterocyclic ring.

The ionen type polycation may be exemplified by an aliphatic ionen expressed by the following general formula:

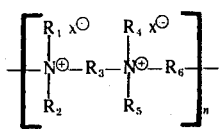

where:
$R_1$, $R_2$, $R_4$ and $R_5$ = alkyl groups
$R_3$ and $R_6$ = alkylene groups
$x^-$ = anion
$n$ = polymerization degree Prominently effective among the above-mentioned aliphatic ionen type polycations are those wherein $R_1$, $R_2$, $R_4$ and $R_5$ denote alkyl groups having one or two carbon atoms, $R_3$ an alkylene group having 1 to 6 carbon atoms and $R_6$ an alkylene group having 2 to 10 carbon atoms. Particularly effective are those polycations wherein $R_1$, $R_2$, $R_4$ and $R_5$ represent alkyl groups having 1 or 2 carbon atoms, $R_3$ an alkylene group having 2 to 4 carbon atoms and $R_6$ an alkylene group having 4 to 8 carbon atoms.

The ionen type polycation can be prepared by the Menschutkin reaction. Namely, said polycation can be formed by reacting ditertiary amines with $\alpha$, $\omega$-halides in a polar solvent such as dimethylformamide. The ionen type polycations include the following compounds:

Poly(N,N,N',N'-tetramethyl-N-ethylene-N'-hexamethylene diammonium dibromide),
Poly(N, N, N', N'-tetramethyl-N-ethylene-N'-pentamethylene diammonium dibromide),
Poly(N, N, N', N'-tetramethyl-N-trimethylene-N'-hexamethylenediammonium dibromide),
Poly(N, N, N', N'-tetramethyl-N-trimethylene-N'-pentamethylenediammonium dibromide).

The pendant type polycations include those of poly(vinyl benzyltrialkylammonium salt), poly(oxyethyl-1-methylenetrialkylammonium salt) and so on which contain quarternary nitrogen in the pendant group.

Preferred types of poly(vinylbenzyltrialkylammonium salt) are poly(vinylbenzyltrimethylammonium salt), poly(vinylbenzyldimethylethylammonium salt), poly(vinylbenzylmethyldiethylammonium salt), and poly(vinylbenzyltriethylammonium salt).

Preferred types of poly(oxyethyl-1-methylenetrialkylammonium salt) are poly(oxyethyl-1-methylenetrimethylammonium salt), poly(oxyethyl-1-methylenedimethylethylammonium salt), poly(oxyethyl-1-methylenemethyldiethylammonium salt) and poly(oxyethyl-1-methylenetriethylammonium salt). Particularly effective among the above-mentioned pendant type polycations are poly(vinylbenzyltrimethylammonium chloride) and poly(oxyethyl-1-methylenetrimethylammonium chloride).

Compounds obtained by quarternizing polyepihalohydrin or a copolymer of epihalohydrin and epoxide with a tertiary amine by the Menschutkin reaction also belong to the group of pendant type polycations and are found effective to suppress the formation of zinc dentrites on the zinc anode. In this case, it is preferred that the above-mentioned quarternization be carried out to a higher degree than 75 percent, whether the tertiary amine is reacted with all or some of the halogen atoms included in the polyepihalohydrin or a copolymer of epihalohydrin and epoxide.

The polyepihalohydrins reacted with the tertiary amine are polyepichlorohydrin, polyepibromohydrin and polyepiiodohydrin.

The epihalohydrin copolymers are obtained by copolymerizing epichlorohydrin, epibromohydrin or epiiodohydrin alone or mixtures thereof with epoxides such as ethylene oxide, propylene oxide, butylene oxide, vinylchloride epoxide, glycidyl ether, 1-dimethylamino-2, 3-epoxipropane and trimethyl-2, 3-epoxipropylammonium chloride.

It is desirable that any of the epihalohydrines or a mixture thereof in the above-mentioned copolymer be larger in a molar amount than the epoxides.

The tertiary amines used in the aforesaid quarternization reaction should preferably consist of amines of low molecular weight such as trimethyl amine, dimethylethylamine, methyldiethyl amine and triethyl amine. Particularly effective among the compounds obtained by quarternizing polyepihalohydrin or epihalohydrin copolymers are those prepared by quarternizing polyepichlorohydrin with trimethyl amine to a higher degree than 75 percent.

The polycations whose molecule contains quarternary nitrogen as a member of the heterocyclic ring include poly(N,N-dialkyldiallylammonium salts). Preferred among these salts are poly(N, N-dimethyldiallylammonium salt) and poly(N,N-diethyldiallylammonium salt). Particularly effective is poly(N, N-dimethyldiallylammonium chloride).

While, as mentioned above, many types of polycations are effective in preventing the formation of zinc dendrites, the kinds of opposing anions to cations included in the polycations are little related to said effect. The opposing anions have only to be such type as does not obstruct the dissociation of cations. Preferred opposing anions are chloride ion, bromide ion, iodide ion and hydroxyl ion.

The polycation whose molecule has two or more cationic ion sites is more effective in suppressing the formation of zinc dendrites than an organic monocation. This is supposed to originate from the fact that as compared with the monocation, the polycation has a lower mobility, the difference of adsorption to zinc crystals, higher apparent viscosity relative to zinc ion species disposed near the surface on which zinc is electrolytically deposited and that the polycation forms a different electric double layer from that obtained by the monocation.

The undermentioned observed events are supposed to prove the above-mentioned difference between the poly- and monocations. Namely, when zinc is electrolytically deposited from a 7N KOH solution saturated with zinc oxide and containing an organic monocation, for example, tetraethylammonium chloride, the electrode potential of zinc deposition presents little difference from that which is observed when zinc is electrolytically deposited from the 7N KOH solution saturated with zinc oxide but free from the above-mentioned organic monocation. On the other hand, the electrode potential of zinc deposition with which zinc is electrolytically deposited from an electrolyte containing a polycation shifts about 100 mV to the negative side as compared with the case where the 7N KOH solution contains the organic monocation. The organic monocation does not vary the limit current density for the electrodeposition of zinc, whereas the polycation reduces said limit current density.

Zinc electrolytically deposited from an electrolyte containing the organic monocation shows a mossy appearance, whereas zinc electrolytically deposited from an electrolyte containing the polycation is compact and presents a smooth surface. As mentioned above, the polycation is obviously more effective in suppressing the formation of zinc dendrites than the organic monocation. This tendency becomes more prominent as the polycation increases in molecular weight. Accordingly, the polycation is desired to have a larger average molecular weight than 500 or more preferably than 1,000 in order to effectively eliminate the formation of zinc dendrite. However, a polycation having a considerably large molecular weight is little soluble in a highly concentrated alkaline solution, and consequently is desired to have a smaller average molecular weight than 50,000, or more preferably than 20,000. According to this invention the electrolyte contains a sufficient amount of polycation to prevent the formation of zinc dendrites on the zinc anode during cell charge. Addition of more than 0.01 percent by weight of polycation based on the weight of an electrolyte displays a prominent effect. Application of more than 0.1 percent by weight of polycation based on the weight of the electrolyte is more effective. There is no upper limit to the amount of polycation added to the electrolyte. Namely, a polycation may be added in an amount exceeding its solubility. In this case, an excess amount of polycation is desired to be present in an electrolyte in contact therewith. This arrangement attains the automatic replenishment of the polycation in the electrolyte which has been deteriorated during the operation of a secondary cell. If, however, an upper limit is to be imposed for an economic reason, it is desired that the polycation be added in a smaller amount than 10 percent by weight, or more preferably than 2 percent by weight. Further, it is possible to add a single kind of polycation or a mixture of two or more kinds of polycation to an electrolyte. An electrolyte medium to which a polycation is to be added should consist of an aqueous alkaline solution containing alkali metal zincate. A preferred type of electrolyte medium is an aqueous solution of alkali metal hydroxides in which zinc oxide is dissolved. Preferred alkali metal hydroxides are sodium hydroxide, potassium hydroxide or lithium hydroxide alone or mixtures thereof.

When an electrolyte medium contains alkali metal hydroxide at as high a concentration as 5 to 15N, then the resultant secondary cell presents a prominent performance. Zinc oxide is dissolved in a solution of alkali metal hydroxide and remains in the form of alkali metal zincate. Since the concentration of the alkali metal zincate varies during cell operation, it would be meaningless to define the amount of the alkali metal zincate. The anode of a secondary cell according to this invention is formed of zinc acting as an active material and may consist of a zinc anode used in an ordinary alkali type cell, for example, zinc plate, porous zinc anode, or composite electrodes formed of zinc substantially acting as an active material. The cathode of a secondary cell according to this invention may consist of, for example, silver oxide, mercury oxide, manganese dioxide, nickel oxide or oxygen diffusion electrode. Where the cathode consists of an oxygen diffusion electrode, it is possible to provide an auxiliary electrode for the charge of a secondary cell in addition to said oxygen diffusion electrode.

A separator may be interposed between the anode and cathode to divide them into two separate chambers thereby avoiding the free mixing of anolyte and catholyte. This arrangement prevents a polycation contained in the anolyte from being exposed to an oxidizing atmosphere prevailing on the surface of a cathode, and in consequence enables the polycation to have a longer and more improved effect of suppressing the formation of zinc dendrites. In this case, the anolyte and catholyte need not be of the same composition.

A secondary cell using an electrolyte containing the polycation of this invention has a long effective life due to freedom from the formation of zinc dendrites. The polycation which is a stable compound can maintain the effect of preventing the formation of zinc dendrites for long in an alkaline solution. This fact renders the secondary cell of this invention far superior to the prior art wherein the proposed polyethylene oxide is found unstable in an alkaline solution.

The electrode potential with which zinc is electrolytically deposited during cell charge from an electrolyte containing the polycation of this invention shifts to the negative side, thereby obstructing the deposition of zinc. This fact offers a substantial advantage to a secondary cell using a porous zinc anode and containing a stationary electrolyte. The reason is that the charge reaction of the zinc anode of this type of secondary cell is a solid phase reduction of zinc oxide settled near the zinc anode; and the reduction potential does not change, whether or not the polycation is present in the electrolyte; but that the electrode potential with which zinc dissolved in the electrolyte is deposited therefrom shifts to the negative side in case the electrolyte contains the polycation, thereby decreasing the amount of zinc deposited on the zinc anode during cell charge, and consequently reducing the possibility of internal short circuit in the secondary cell.

This invention will be more fully understood by reference to the examples which follow.

EXAMPLE 1

Powders of zinc oxide were kneaded into paste using a 5% aqueous solution of polyvinyl alcohol. The paste was coated on a nickel mesh and dried. The coated mesh was subjected to electrolytic reduction for 48 hours with current density of 4.5 A/dm$^2$ in a 7N aqueous solution of potassium hydroxide to prepare a zinc anode. The zinc anode thus prepared had dimensions of 10 cm × 10 cm × 1mm and a theoretic capacity of 23 Ah.

The cathode of the secondary cell consisted of nickel oxide commonly used in a nickel-cadmium cell which was prepared by attaching nickel oxide to a porous plate of sintered nickel.

One zinc anode and two cathodes were separately wrapped in cellophane. The members were received in a case of polyvinyl chloride with the zinc anode disposed between the two cathodes.

Five secondary cells constructed as described above were used. Each cell was charged with 100 ml of an electrolyte prepared by adding one of the polycations set forth in the item of additives of the following Table 1 to a 8.5N aqueous KOH solution saturated with zinc oxide in an amount of 1 percent by weight based on the weight of said KOH solution. Each cell was discharged with current of 7 amperes until the cell voltage fell to 0.8 volt. Thereafter, the cell was charged for 130 minutes by passing current of 3.5 amperes therethrough. This cycle of charge and discharge was repeated until the capacity of the cell decreased to 60 percent of its original level.

Table 1

| Cell No. | Kind of polycation used as additive | Number of charge and discharge cycles before failure |
|---|---|---|
| 1 | Poly(N,N,N',N'-tetramethyl-N-trimethylene-N'-pentamethylene diammonium dibromide) | 115 |
| 2 | Poly(oxyethyl-1-methylenetrimethyl ammonium chloride) | 156 |
| 3 | Poly(N,N-dimethyldiallylammonium chloride) | 173 |
| 4 | Poly(vinylbenzyltrimethylammonium chloride) | 107 |
| 5 | No polycation | 23 |

The control cell No. 5 using an electrolyte containing no polycation gave rise to internal short circuiting due to the formation of zinc dendrites when the cycle of charge and discharge was repeated 23 times. In contract, the cells Nos. 1 to 4 had an effective life corresponding to more than 100 cycles of charge and discharge.

EXAMPLE 2

A secondary cell was provided whose zinc anode was same as in Example 1 and whose cathode was composed of two gas diffusion electrodes measuring 10 cm × 10 cm prepared by coating active carbon on the surface of a porous plate of sintered nickel with polytetrafluoroethylene used as a binder. The cell further had an auxiliary electrode of nickel net disposed between the anode and cathode and a cellulose fiber separator interposed between the respective electrodes.

The polycation added to an electrolyte was a type quarternized by reacting trimethylamine with polyepichlorohydrin having an average molecular weight of 4,620 with the molar ratio of the trimethyl amine to the epichlorohydrin monomer set at 0.75.

An electrolyte was prepared by adding 5g of the polycation to 100g of a 10N aqueous solution of KOH saturated with zinc oxide. Part of the polycation was dissolved in the electrolyte, and the remainder floated on the surface of the electrolyte. One gram of cyclohexanol was added to the electrolyte to prevent the generation of foams during cell charge.

A secondary cell charged with an electrolyte thus prepared was tested for a cycle life by repeating charges and discharges. The cell was discharged with current of 7 amperes therethrough until the cell voltage was reduced to 0.7 volt. The cell was charged for 4 hours by passing current of 2 amperes therethrough. A similar type of cell to that mentioned above was charged with a 10N aqueous solution of KOH saturated with zinc oxide but free from a polycation and tested for a cycle life by repeating charges and discharges, the results being set forth in Table 2 below.

Table 2

| Kind of electrolyte | Number of cycles before failure |
|---|---|
| An electrolyte containing a polycation | More than 100 |
| An electrolyte free from a polycation | 16 |

EXAMPLE 3

A zinc-oxygen gas diffusion electrode type cell was constructed with the cathode of two oxygen gas diffusion electrodes as in Example 2, the anode substrate of a nickel plate measuring 10 cm × 10 cm and an auxiliary electrode of nickel mesh for cell charge between the anode and cathode. An electrolyte was made to circulate through the cell. The cell was connected through a pump to two electrolyte reservoirs each having a capacity of 1 liter. One of the reservoirs was filled with an electrolyte in which zinc oxide was dissolved. When the cell was charged, the electrolyte was pumped to the cell. The electrolyte passing through the cell was collected in the other empty reservoir. While the electrolyte traveled through the cell, the zinc ion thereof was electrolytically deposited on the anode substrate to form an anode. Discharge was carried out by conducting the electrolyte in the opposite direction to that in which the electrolyte passed through the cell for its charge. At this time, zinc of anode is dissolved in the electrolyte.

The polycation was prepared by reacting trimethyl amine with polyepichlorohydrin having an average molecular weight of 2,880 with the molar ratio of the trimethyl amine to the epichlorohydrin monomer set at 0.95.

Five grams of the polycation and 60g of zinc oxide were dissolved in 1 liter of an 8.5N aqueous solution of KOH to prepare an electrolyte. By way of comparison, another type of electrolyte was prepared by dissolving 60g of zinc oxide in 1 liter of the 8.5N aqueous solution of KOH but omitting the polycation.

The cell was charged for 4 hours by passing current of 2 amperes between the anode substrate and the auxiliary electrode while introducing a control electrolyte free from the polycation in the cell from one of the reservoirs at the rate of 4 ml/min. The cell was discharged by conducting said control electrolyte in the opposite direction to the case of cell charge with current of 4 amperes through the cell until the cell voltage was reduced substantially to zero volt. When the above-mentioned cycle of charges and discharges was repeated five times, zinc dendrites or flakes falling off the anode were found to settle on the cell bottom. The same test was made by replacing the control electrolyte by the one containing the polycation, showing that the amount of fallen zinc pieces was negligibly small, and that after completion of cell charge, the zinc anode had a smooth surface and was free from the formation of zinc dendrites.

EXAMPLE 4

The same zinc-oxygen gas diffusion electrode type cell as in Example 3 was used. Electrolytes containing various molecular weights of polycation were used to observe the different surface appearances of the zinc anode at the end of cell charge. The charge was carried out for 4 hours by passing current of 2 amperes through the cell. Six kinds of electrolyte were prepared by adding 10g of the respective polycations shown in the item of additives of Table 3 below to 1 liter of a 7N aqueous solution of KOH, the results being set forth in said Table 3.

Table 3

| Polycation Nos. | Polycation used as an additive | Average molecular weight | Surface condition of zinc anode |
|---|---|---|---|
| 1 | Poly(N,N,N',N'-tetramethyl-N-ethylene-N'-hexamethylene diammonium dibromide | about 10,000 | Smooth |
| 2 | Poly(N,N,N',N'-tetramethyl-N-trimethylene-N'-hexamethylene diammonium dibromide) | about 20,000 | Smooth |
| 3 | N,N,N,N',N',N'-hexamethyl trimethylene diammonium dibromide | 320 | Mossy appearance |
| 4 | Poly(oxyethyl-1-methylene-trimethyl ammonium chloride) | 7,400 | Smooth |
| 5 | " | 4,600 | Smooth |
| 6 | " | 800 | Mossy appearance |

The polycations Nos. 3 and 6 having a smaller molecular weight than 1000 gave rise to the deposition of mossy zinc consisting of aggregates of very fine dendrites, indicating an inferior effect to the other polycations having larger molecular weights.

EXAMPLE 5

The same type of cell as used in Example 3 was charged with an electrolyte prepared from an 8.5N aqueous solution of KOH saturated with zinc oxide and containing 0.5 percent by weight of poly(oxyethyl-1-methylenetrimethylammonium chloride) after the electrolyte was allowed to stand for 6 months. After cell charge, the zinc anode presented a smooth surface.

On the other hand, an electrolyte consisting of an 8.5N aqueous solution of KOH saturated with zinc oxide and containing 0.5 percent by weight of polyethylene glycol having a molecular weight of 400, when used immediately after being prepared, caused zinc to be deposited in the mossy form and was found to display an effect of suppressing the formation of zinc dendrites. When used 6 months after prepared, however, said electrolyte gave rise to the prominent formation of zinc dendrites. Accordingly, it has been found that the polycation of this invention is chemically more stable and maintains a longer effect than any of the prior art substances proposed to prevent the formation of zinc dendrites.

EXAMPLE 6

A secondary cell was provided wherein the anode and cathode consisted of the zinc anode and nickel oxide cathode respectively described in connection with Example 1; and the anode and cathode were separated by a finely porous separator of hydrophilic polyethylene, so as to obstruct the free mixing of the anolyte and catholyte. The anolyte consisted of a 10N aqueous solution of KOH saturated with zinc oxide and containing 1 percent by weight of poly(N, N, N', N'-tetramethyl-N-ethylene-N'-pentamethylenediammonium dibromide). The catholyte consisted of a 10N aqueous solution of KOH saturated with zinc oxide. With a cell constructed as described above, the polycation was little likely to be brought into contact with the cathode and in consequence little subject to oxidation decomposition. The cell was put to the same charge and discharge test as in Example 1, proving that it withstood more than 150 cycles of charges and discharges.

What we claim is:

1. A rechargeable galvanic cell comprising a zinc anode, a cathode and an electrolyte wherein the electrolyte comprises an aqueous alkaline solution containing alkali metal zincate and a polycation selected from the group consisting of ionen type polycation and pendant type polycation in an amount sufficient to suppress the formation of zinc dendrites on said zinc anode during cell charge, said ionen type polycation having quaternary nitrogen included in the main chain of the molecule and said pendant type polycation having quaternary nitrogen included in the side chain of the molecule.

2. A rechargeable galvanic cell according to claim 1 wherein the polycation is an aliphatic ionen expressed by the following general formula:

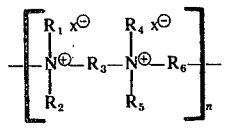

where:
 $n$ = degree of polymerization
 $x^-$ = anion
 $R_1$, $R_2$, $R_4$ and $R_5$ = alkyl groups having one to two carbon atoms
 $R_3$ = alkylene group having 1 to 6 carbon atoms
 $R_6$ = alkylene group having 2 to 10 carbon atoms.

3. A rechargeable galvanic cell according to claim 1 wherein the polycation is an aliphatic ionen expressed by the following general formula:

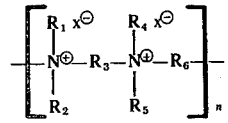

where:
 $n$ = degree of polymerization
 $x^-$ = anion
 $R_1$, $R_2$, $R_4$ and $R_5$ = alkyl groups having 1 to 2 carbon atoms
 $R_3$ = alkylene group having 2 to 4 carbon atoms
 $R_6$ = alkylene group having 4 to 8 carbon atoms.

4. A rechargeable galvanic cell according to claim 2 wherein the polycation is poly(N, N, N', N'-tetramethyl-N-ethylene-N'-hexamethylene diammoniumdibromide).

5. A rechargeable galvanic cell according to claim 2 wherein the polycation is poly(N, N, N', N'-tetramethyl-N-ethylene-N'-pentamethylenediammonium dibromide).

6. A rechargeable galvanic cell according to claim 2 wherein the polycation is poly(N, N, N', N'-tetramethyl-N-trimethylene-N'-hexamethylenediammonium dibromide).

7. A rechargeable galvanic cell according to claim 2 wherein the polycation is poly(N, N, N', N'-tetramethyl-N-trimethylene-N'-pentamethylenediammonium dibromide).

8. A rechargeable galvanic cell according to claim 1 wherein the polycation is poly(vinylbenzyltrialkylammonium salt).

9. A rechargeable galvanic cell according to claim 8 wherein the polycation is poly(vinylbenzyltrimethylammonium chloride).

10. A rechargeable galvanic cell according to claim 1 wherein the polycation is poly(oxyethyl-1-methylenetrialkylammonium salt).

11. A rechargeable galvanic cell according to claim 10 wherein the polycation is poly(oxyethyl-1-methylenetrimethylammonium chloride).

12. A rechargeable galvanic cell according to claim 1 wherein the polycation is prepared by quarternizing polyepihalohydrin with trimethylamine.

13. A rechargeable galvanic cell according to claim 12 wherein the polycation is prepared by quarternizing polyepichlorohydrin with trimethylamine.

14. A rechargeable galvanic cell according to claim 1 wherein the polycation has an average molecular weight of 500 to 50,000.

15. A rechargeable galvanic cell according to claim 1 wherein the polycation has an average molecular weight of 1,000 to 20,000.

16. A rechargeable galvanic cell according to claim 1 wherein the polycation is present in the electrolyte in an amount of 0.01 to 10 percent by weight based on the weight of said electrolyte.

17. A rechargeable galvanic cell according to claim 1 wherein the polycation is present in the electrolyte in an amount of 0.1 to 2 percent by weight based on the weight of said electrolyte.

* * * * *